No. 857,106. PATENTED JUNE 18, 1907.
T. PENDERGAST.
GASKET FOR PIPE COUPLINGS.
APPLICATION FILED APR. 13, 1906.
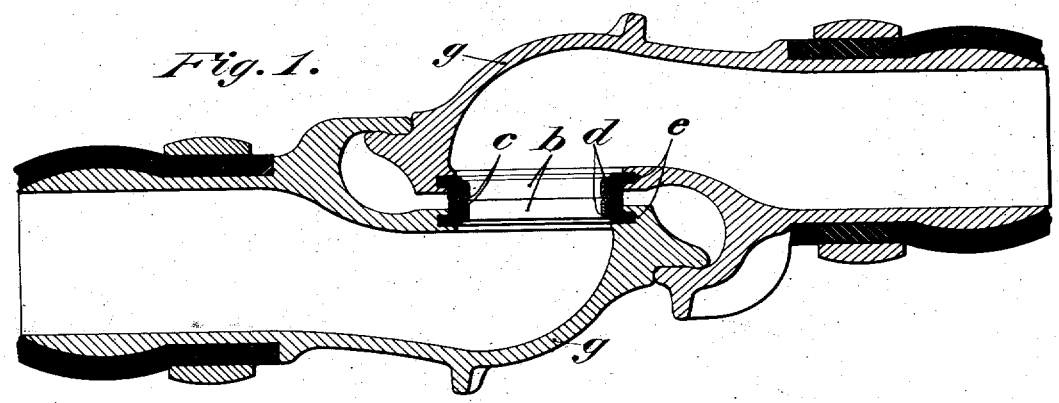
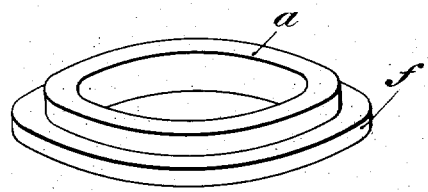
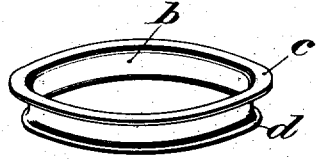
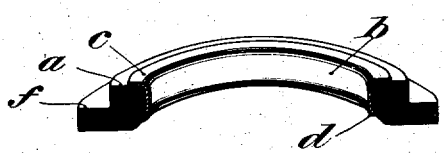
WITNESSES
INVENTOR
Thomas Pendergast
By Julian C. Orwith
his Attorneys.

UNITED STATES PATENT OFFICE.

THOMAS PENDERGAST, OF LANCASTER, PENNSYLVANIA, ASSIGNOR OF FIFTY-ONE ONE-HUNDREDTHS TO JOHN HERTZLER, OF LANCASTER, PENNSYLVANIA.

GASKET FOR PIPE-COUPLINGS.

No. 857,106.     Specification of Letters Patent.     Patented June 18, 1907.

Application filed April 13, 1906. Serial No. 311,574.

*To all whom it may concern:*

Be it known that I, THOMAS PENDERGAST, a citizen of the United States, residing at Lancaster, in the county of Lancaster and State of Pennsylvania, have invented certain new and useful Improvements in Gaskets for Pipe-Couplings; and I do hereby declare the following to be a full, clear, and exact description of the invention, such as will enable others skilled in the art to which it appertains to make and use the same.

This invention relates to gaskets or packing-rings for train-pipe or similar couplings wherein a pair of rubber rings or gaskets are usually employed in opposition in the two coupling-heads, in order to make a steam-tight joint.

The objects are to stiffen and reinforce the rubber rings of the coupling, so as to expand them firmly and rigidly in their seats or recesses; to prolong the life of the gaskets by providing metallic contact surfaces therefor, and yet insure a steam-tight joint, and to preserve the elasticity or yielding properties of the packing.

In the accompanying drawings, which form a part of this specification: Figure 1 is a longitudinal vertical section of a train-pipe coupling, fitted with gaskets embodying my invention. Fig. 2 is a perspective view of one of the rubber rings, without its metallic lining or inner reinforcing ring. Fig. 3 is a perspective view of the said metallic lining or reinforcing ring. Fig. 4 is a sectional perspective view of the complete metallic lined gasket. Fig. 5 is a sectional perspective view of another form of such gasket. Fig. 6 is a sectional perspective view of another form of metallic ring or lining, having a narrower top flange or margin.

The illustrated gasket comprises an ordinary thick rubber or other elastic ring $a$, with a cylindrical sheet-metal ring or lining $b$ fitted therein, the latter having a top flange $c$ overlying the inner marginal portion only of the top face of the rubber ring, and having a slightly spread or flaring bottom edge $d$ which sets within the rubber ring and bears or embeds more or less in the rubber, holding the parts in proper relation, the body of the rubber ring being embraced between the top flange $c$ and the rib or bottom edge $d$ of the metal lining, the rubber ring being stretched over the metal ring to properly inclose the same. By this construction, the gasket presents an annular metallic face $c$ for contact with the similar metallic face of the opposing gasket in the pipe-coupling, saving frictional wear and deterioration incident to contact of rubber faces, the rubber being further protected by its interior lining; while at the same time, the base of the gasket being exposed rubber, the usual yielding qualities are maintained, due to the compressibility or elasticity of the rubber ring between its base and the flange $c$ of the metal ring, so that the rubber ring can be tightly fitted to its seat or in its socket, while the requisite yielding is allowed when the coupling members are clamped or compressed together. Moreover, since the top flange $c$ of the metal ring $b$ covers only an annular portion of the top face of the rubber ring, the compression or yielding of opposing gaskets under pressure crowds up the rubber around said flange $c$, thus giving a packing of metal to metal surrounded by rubber to rubber, providing metallic contact faces and yet insuring a tight joint around the same. This feature is illustrated in Fig. 1, where two of the gaskets as above described are shown seated in annular sockets $e$ around the opposing openings in the two coupling members $g$. In this case, the rubber rings or gaskets proper are formed with outer base flanges $f$, shown in Figs. 1, 2 and 4, which are seated in the said annular sockets $e$ of the coupling members. In Fig. 5, another form of gasket is shown, in which the rubber ring is made without such annular flange, this style of gasket being designed to fit within an annular seat around the opening in its coupling member. Besides protecting the rubber gaskets, the rings reinforce the gaskets, and expand the same firmly and rigidly in the recesses of the coupling, thereby preventing any possible chance of the gaskets becoming loose or falling out of the coupling when uncoupled.

In the operation of coupling the two parts of the coupler, the gaskets are turned on the exposed faces of the gaskets, and wear and tear and consequent leakage is prevented by the contact between the metal parts. When the parts of the coupling are locked together, the faces of the reinforcing rings disappear below the surface of the exposed rubber faces of the gaskets, so that the said rubber faces are pressed tightly together, making a perfectly tight seal with no chance for leakage. In Fig. 6, the reinforcing ring is made with a small cone or flaring-shaped at each end, so that either and can be adjusted to the rubber gasket.

I am aware that heretofore gaskets have been made having metallic linings, which gaskets however have been unyielding. I therefore make no claim to the combination of a rubber ring end metal lining broadly, but

What I claim as my invention and desire to secure by Letters Patent of the United States is:

1. A gasket for train-pipe or similar couplings, comprising a ring of rubber or other elastic material having an annular metallic facing on one marginal portion only of the face of said ring, leaving a surrounding exposed rubber portion, the body of said ring being yieldable or elastic; whereby two of such rings in opposition in a coupling have metallic contact faces surrounded by rubber which under pressure crowds around said contact faces to make a steam-tight joint.

2. A gasket for train-pipe and similar couplings, comprising a thick rubber or other elastic ring, and a stiff reinforcing ring or metallic lining secured only in the inside of said rubber ring and having a top flange overlying the inner marginal portion only of the face of said rubber ring, leaving the body of said rubber ring elastic and leaving an annular exposed face of rubber around said flange, substantially as described.

3. A gasket for train-pipe and similar couplings, comprising a thick rubber or other elastic ring, and a stiff metallic lining or reinforcing ring fitted therein having an outset bottom edge or rib embedding in the rubber inside the rubber ring and having a narrow top flange overlying the inner portion only of the face of said elastic ring.

4. A gasket for train-pipe and similar couplings, comprising a thick rubber or other elastic ring, and a stiff metallic lining therein consisting of a cylindrical sheet-metal ring having a flaring bottom portion and having a narrow top flange overlying the inner portion only of the face of said elastic ring.

5. A reinforcing ring or lining for rubber gaskets comprising a cylindrical sheet-metal ring having a narrow top flange and a flaring bottom edge, said ring adapted to be secured inside of a rubber or elastic gasket, substantially as described.

6. The combination, in a train-pipe coupling, of the coacting coupling-heads having seats for opposing gaskets, and the gaskets fitted therein consisting of rubber or other elastic rings having inside metallic reinforcing ring with top flanges overlying the inner marginal portions only of the faces of said elastic rings, whereby in bringing the coupling-heads together the gaskets present metallic contact faces, and when the coupling-heads are clamped or drawn together the surrounding rubber portions of the rings are pressed closely together around said metallic flanges, making a fluid-tight joint.

In testimony whereof I affix my signature, in presence of two witnesses.

THOMAS PENDERGAST.

Witnesses:
REDMOND CONYNGHAM,
E. B. GROFF.

---

It is hereby certified that in Letters Patent No. 857,106, granted June 18, 1907, upon the application of Thomas Pendergast, of Lancaster, Pennsylvania, for an improvement in "Gaskets for Pipe-Couplings," errors appear in the printed specification requiring correction, as follows: On page 2, line 4, the word "and" should read *end;* line 10, same page, the word "end" should read *and*, and in line 62, same page, the word "ring" should read *rings;* and that the said Letters Patent should be read with these corrections therein that the same may conform to the record of the case in the Patent Office.

Signed and sealed this 16th day of July, A. D., 1907.

[SEAL.]

C. C. BILLINGS,
*Acting Commissioner of Patents.* ing a perfectly tight seal with no chance for leakage. In Fig. 6, the reinforcing ring is made with a small cone or flaring-shaped at each end, so that either and can be adjusted to the rubber gasket.

I am aware that heretofore gaskets have been made having metallic linings, which gaskets however have been unyielding. I therefore make no claim to the combination of a rubber ring end metal lining broadly, but

What I claim as my invention and desire to secure by Letters Patent of the United States is:

1. A gasket for train-pipe or similar couplings, comprising a ring of rubber or other elastic material having an annular metallic facing on one marginal portion only of the face of said ring, leaving a surrounding exposed rubber portion, the body of said ring being yieldable or elastic; whereby two of such rings in opposition in a coupling have metallic contact faces surrounded by rubber which under pressure crowds around said contact faces to make a steam-tight joint.

2. A gasket for train-pipe and similar couplings, comprising a thick rubber or other elastic ring, and a stiff reinforcing ring or metallic lining secured only in the inside of said rubber ring and having a top flange overlying the inner marginal portion only of the face of said rubber ring, leaving the body of said rubber ring elastic and leaving an annular exposed face of rubber around said flange, substantially as described.

3. A gasket for train-pipe and similar couplings, comprising a thick rubber or other elastic ring, and a stiff metallic lining or reinforcing ring fitted therein having an outset bottom edge or rib embedding in the rubber inside the rubber ring and having a narrow top flange overlying the inner portion only of the face of said elastic ring.

4. A gasket for train-pipe and similar couplings, comprising a thick rubber or other elastic ring, and a stiff metallic lining therein consisting of a cylindrical sheet-metal ring having a flaring bottom portion and having a narrow top flange overlying the inner portion only of the face of said elastic ring.

5. A reinforcing ring or lining for rubber gaskets comprising a cylindrical sheet-metal ring having a narrow top flange and a flaring bottom edge, said ring adapted to be secured inside of a rubber or elastic gasket, substantially as described.

6. The combination, in a train-pipe coupling, of the coacting coupling-heads having seats for opposing gaskets, and the gaskets fitted therein consisting of rubber or other elastic rings having inside metallic reinforcing ring with top flanges overlying the inner marginal portions only of the faces of said elastic rings, whereby in bringing the coupling-heads together the gaskets present metallic contact faces, and when the coupling-heads are clamped or drawn together the surrounding rubber portions of the rings are pressed closely together around said metallic flanges, making a fluid-tight joint.

In testimony whereof I affix my signature, in presence of two witnesses.

THOMAS PENDERGAST.

Witnesses:
REDMOND CONYNGHAM,
E. B. GROFF.

---

It is hereby certified that in Letters Patent No. 857,106, granted June 18, 1907, upon the application of Thomas Pendergast, of Lancaster, Pennsylvania, for an improvement in "Gaskets for Pipe-Couplings," errors appear in the printed specification requiring correction, as follows: On page 2, line 4, the word "and" should read *end;* line 10, same page, the word "end" should read *and,* and in line 62, same page, the word "ring" should read *rings;* and that the said Letters Patent should be read with these corrections therein that the same may conform to the record of the case in the Patent Office.

Signed and sealed this 16th day of July, A. D., 1907.

[SEAL.]

C. C. BILLINGS,
*Acting Commissioner of Patents.*

Corrections in Letters Patent No. 857,106.

It is hereby certified that in Letters Patent No. 857,106, granted June 18, 1907, upon the application of Thomas Pendergast, of Lancaster, Pennsylvania, for an improvement in "Gaskets for Pipe-Couplings," errors appear in the printed specification requiring correction, as follows: On page 2, line 4, the word "and" should read *end;* line 10, same page, the word "end" should read *and*, and in line 62, same page, the word "ring" should read *rings;* and that the said Letters Patent should be read with these corrections therein that the same may conform to the record of the case in the Patent Office.

Signed and sealed this 16th day of July, A. D., 1907.

[SEAL.]

C. C. BILLINGS,
*Acting Commissioner of Patents.*